(12) United States Patent
Creemer

(10) Patent No.: US 8,037,208 B2
(45) Date of Patent: Oct. 11, 2011

(54) METHOD AND SYSTEM FOR DEVICE BOOTSTRAPPING VIA SERVER SYNCHRONIZATION

(75) Inventor: David Creemer, Palo Alto, CA (US)

(73) Assignee: Access Co., Ltd., Tokyo (JP)

( * ) Notice: Subject to any disclaimer, the term of this patent is extended or adjusted under 35 U.S.C. 154(b) by 0 days.

(21) Appl. No.: 11/781,972

(22) Filed: Jul. 24, 2007

(65) Prior Publication Data

US 2008/0016250 A1    Jan. 17, 2008

Related U.S. Application Data

(63) Continuation of application No. 10/967,977, filed on Oct. 18, 2004, now Pat. No. 7,249,198, which is a continuation of application No. 09/576,730, filed on May 23, 2000, now Pat. No. 6,990,533.

(51) Int. Cl.
*G06F 15/16* (2006.01)

(52) U.S. Cl. ............ 709/248; 709/222; 709/232; 714/1; 714/10; 714/12

(58) Field of Classification Search .................. 709/222, 709/232, 248; 714/1, 10, 12; 707/201, 202, 707/204
See application file for complete search history.

(56) References Cited

U.S. PATENT DOCUMENTS

| | | | | |
|---|---|---|---|---|
| 5,577,210 | A | 11/1996 | Abdous et al. ................ 709/219 |
| 5,710,922 | A | 1/1998 | Alley et al. ................... 707/201 |
| 5,907,827 | A | 5/1999 | Fang et al. ................... 704/503 |
| 5,930,366 | A | 7/1999 | Jamal et al. .................... 370/509 |
| 5,986,568 | A * | 11/1999 | Suzuki et al. ............ 340/825.52 |
| 6,006,274 | A | 12/1999 | Hawkins et al. .............. 709/248 |
| 6,148,253 | A * | 11/2000 | Taguchi et al. ................. 701/48 |
| 6,205,448 | B1 | 3/2001 | Kruglikov et al. ............ 707/200 |
| 6,327,617 | B1 | 12/2001 | Fawcett ........................ 709/219 |
| 6,370,521 | B1 | 4/2002 | Pigos et al. ....................... 707/2 |
| 6,393,434 | B1 | 5/2002 | Huang et al. .................. 707/200 |
| 6,405,218 | B1 | 6/2002 | Boothby ....................... 707/201 |
| 6,438,563 | B1 | 8/2002 | Kawagoe ...................... 707/201 |
| 6,463,413 | B1 | 10/2002 | Applebaum et al. ........ 704/256.2 |
| 6,466,951 | B1 | 10/2002 | Birkler et al. ................. 707/201 |
| 6,470,329 | B1 | 10/2002 | Livschitz .......................... 707/1 |
| 6,493,430 | B2 * | 12/2002 | Leuca et al. ................ 379/88.12 |
| 6,510,424 | B1 | 1/2003 | Ford et al. ......................... 707/3 |
| 6,526,413 | B2 | 2/2003 | Schwitters et al. ........ 707/104.1 |
| 6,636,873 | B1 | 10/2003 | Carini et al. ................... 707/201 |
| 6,647,103 | B2 | 11/2003 | Pinard et al. ............ 379/110.01 |
| 6,687,831 | B1 * | 2/2004 | Albaugh et al. ................... 726/7 |
| 7,010,603 | B2 * | 3/2006 | Martin et al. ................. 709/227 |
| 7,062,765 | B1 * | 6/2006 | Pitzel et al. .................... 717/177 |
| 7,096,273 | B1 | 8/2006 | Meier ........................... 709/236 |

* cited by examiner

*Primary Examiner* — Liangche A Wang
(74) *Attorney, Agent, or Firm* — Berry & Associates P.C.

(57) ABSTRACT

A method and system for restoring basic functionality to a portable computer system via a server accessed remotely by telephone. A user of a portable computer system which has lost data and software which was held in volatile memory may connect to a server to restore basic functionality to the portable computer system. The server may be an enterprise or a web-based server. The connection may be made, for instance, over a 1-800 or a 1-900 telephone line. The server transfers sufficient software to the RAM of the portable computer for it to regain basic functionality. For example, synchronization software may be transferred to the portable computer. The portable computer may then use the synchronization software to synchronize via the server or host connection more fully in order to restore lost data or lost software applications that were stored on a server or on a host computer system. The step of synchronizing to restore lost data and applications may be done with a second server or, in another embodiment, with the same server which helped the portable computer system regain basic functionality. In one embodiment, the portable computer system can be a palmtop computer system.

7 Claims, 10 Drawing Sheets

METHOD AND SYSTEM FOR DEVICE BOOTSTRAPPING VIA SERVER SYNCHRONIZATION

CROSS REFERENCE TO RELATED APPLICATIONS

This application is a continuation application of application Ser. No. 10/967,977, entitled "METHOD AND SYSTEM FOR DEVICE BOOTSTRAPPING VIA SERVER SYNCHRONIZATION", filed Oct. 18, 2004, to be issued as U.S. Pat. No. 7,249,198, which is a continuation application of application Ser. No. 09/576,730, entitled "METHOD AND SYSTEM FOR DEVICE BOOTSTRAPPING VIA SERVER SYNCHRONIZATION", filed May 23, 2000, now U.S. Pat. No. 6,990,533, and assigned to the assignee of the present application. The subject matter in the above-identified co-pending and commonly owned applications is incorporated herein by reference.

BACKGROUND OF THE INVENTION

1. Field of the Invention

The present invention relates to the field of data processing systems. Specifically, the present invention relates to a method and apparatus for restoring basic functionality to a portable computer system which has lost the contents of volatile memory.

2. Related Art

As the components required to build a computer system have reduced in size, new categories of computer systems have emerged. One of the new categories of computer systems is the "palmtop" computer system. A palmtop computer system (otherwise known as a personal digital assistant or PDA) is a computer that is small enough to be held in the hand of a user and can be "palm-sized." Most PDA computer systems are used to implement various Personal Information Management (PIM) applications such as an address book, a daily organizer and electronic notepads, to name a few.

It has proven useful to synchronize PDA computers to other computer systems. The synchronization process allows the two systems to exchange data or for the PDA to receive software from a host system. Conventionally, to synchronize to a desktop computer the user inserts the PDA into a cradle device, which is connected to the desktop computer system. The cradle provides electrical communication between the PDA and the host system. In this fashion, a single PDA may be synchronized with a single desktop. Alternatively, a server may synchronize with several PDAs connecting via a modem.

As PDA computer systems are designed for portability, they are battery operated. Additionally, some conventional PDAs store key software in volatile memory (RAM). Therefore, if the PDA's battery should fail, the key software will be lost. Conventionally, to restore the PDA a user may install a new battery into the PDA and 'cold-boot' the PDA. FIG. 1 shows a diagram for this configuration. The user puts the PDA 100 into the cradle device 60 and synchronizes to a desktop computer system 56. The PDA 100 uses synchronization code stored in non-volatile memory (ROM) 103. The desktop 56 has synchronization code 20, as well as restore code 22. Restore code 22 is sent to PDA 100 and stored in RAM 102. In so doing, basic functionality is restored to the PDA 100.

However, many users carry their PDAs with them in the field. For example, members of a sales force may each have a PDA that synchronizes with a common server. Restoring functionality to a PDA device in the field can be problematic. For example, the desktop computer which the user conventionally synchronizes with the PDA to restore functionality may be turned off, or the user may be otherwise unable to make a connection to the desktop remotely.

Furthermore, the user may be unable to synchronize the PDA to the server. This is because in some conventional systems, even though much of the synchronization software resides on the host system (server), a certain amount resides in the PDA's volatile memory. Importantly, the PDA software which allows synchronization to a server, as opposed to a desktop, is sometimes conventionally stored in RAM in the PDA. Additionally, the software which facilitates logging into the server is sometimes stored in RAM in the PDA. Consequently, after a device battery failure, a user may be unable to synchronize the PDA to a server because this software is gone.

PDAs also store user entered data, as well as software applications in volatile memory. While the data may be backed up periodically on a server or desktop computer, the PDA may be unable to access this data without the server synchronization software or a connection to the desktop. Furthermore, without synchronization software the user may be unable to remotely reload the application software onto the PDA. If the user had access to a desktop computer system, he could perhaps reload the software and synchronize the data. However, when in the field, this option is generally unavailable.

PDAs generally store operating system software in non-volatile memory. However, patches may periodically be made to the operating system by adding code to volatile memory. When the device loses power, these operating system patches are lost. Again, the user faces the problem of how to regain basic functionality when at a remote location.

Additionally, a user who loses a PDA device and purchases a replacement device may face the same problems as a user whose PDA lost the contents of memory.

SUMMARY OF THE INVENTION

Therefore, it would be advantageous, then, to provide a method or system that allows a PDA computer system which is being used in-the-field and has lost the contents of volatile memory to regain basic functionality. What is also needed is a method for restoring data, application software, and operating system updates which are lost when the user is in the field. Furthermore, a method is needed to assist a user of a replacement PDA to load, in the field, the software and data which the original PDA contained. What is still further needed is a user friendly method which is available 24 hours a day.

Accordingly, the present invention provides a method and system that allows a PDA computer system that has lost the contents of volatile memory to regain basic functionality while still in the field. The present invention further provides a method and system for restoring data, application software, and operating system updates which are lost when the user is in the field. Furthermore, the present invention provides a method and system to assist a user of a replacement PDA to replace the data and software which the original PDA contained—while still in the field. Additionally, the present invention is available to users 24 hours a day. The present invention provides these advantages and others not specifically mentioned above but described in the sections to follow.

A method and system for restoring basic functionality to a portable computer system via a server accessed remotely by telephone are disclosed. A user of a portable computer system which has lost data and software which was held in volatile memory may connect to a server to restore basic functionality to the portable computer system. The server may be an enterprise or a web-based server. The connection may be made, for instance, over a 1-800 or a 1-900 telephone line. The server transfers sufficient software to the RAM of the portable computer for it to regain basic functionality. For example, synchronization software may be transferred to the portable computer. The portable computer may then use the synchronization software to synchronize via the server or host connection more fully in order to restore lost data or lost software applications that were stored on a server or on a host computer system. The step of synchronizing to restore lost data and applications may be done with a second server or, in another embodiment, with the same server which helped the portable computer system regain basic functionality. In one embodiment, the portable computer system can be a palmtop computer system.

In one embodiment, when the PDA first contacts the server, the server sends a menu of download options which may include: client server synchronization software, application programs, operating system patches, etc. The user may then synchronize to the client server to receive lost data and/or additional software. In another embodiment, all synchronizations are done in a single call to one server.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Personal Digital Assistant Platform

Figure 1:
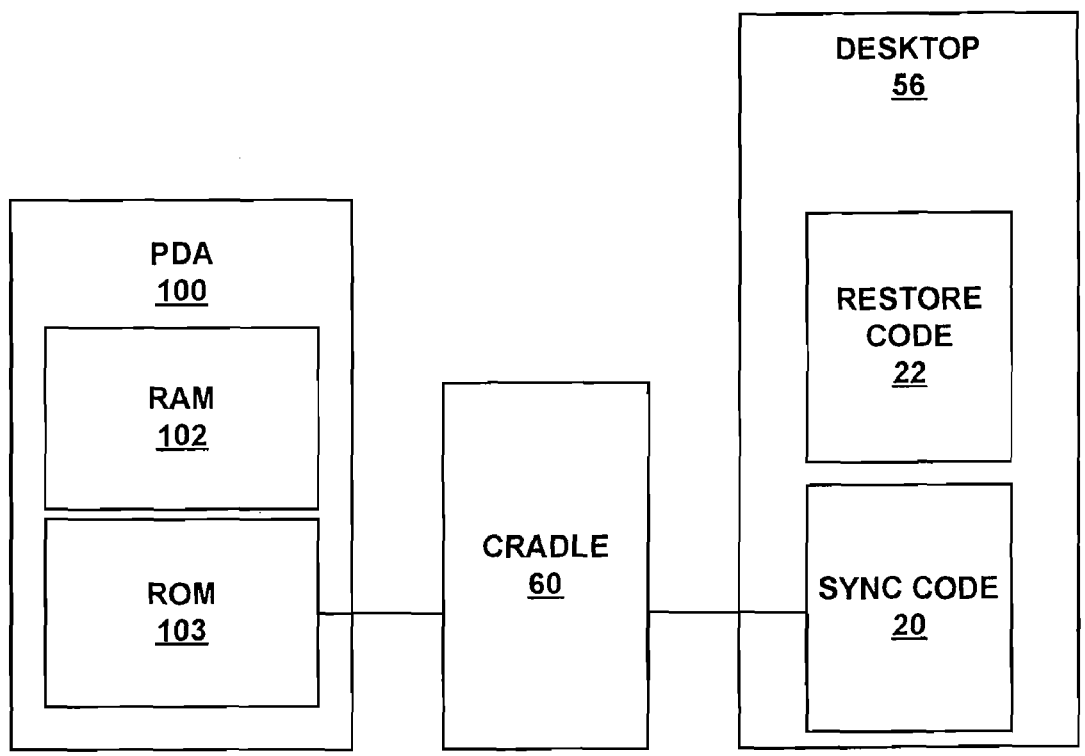
FIG. 1 is a prior art block diagram showing a PDA synchronizing to a desktop computer system.
Figure 2:
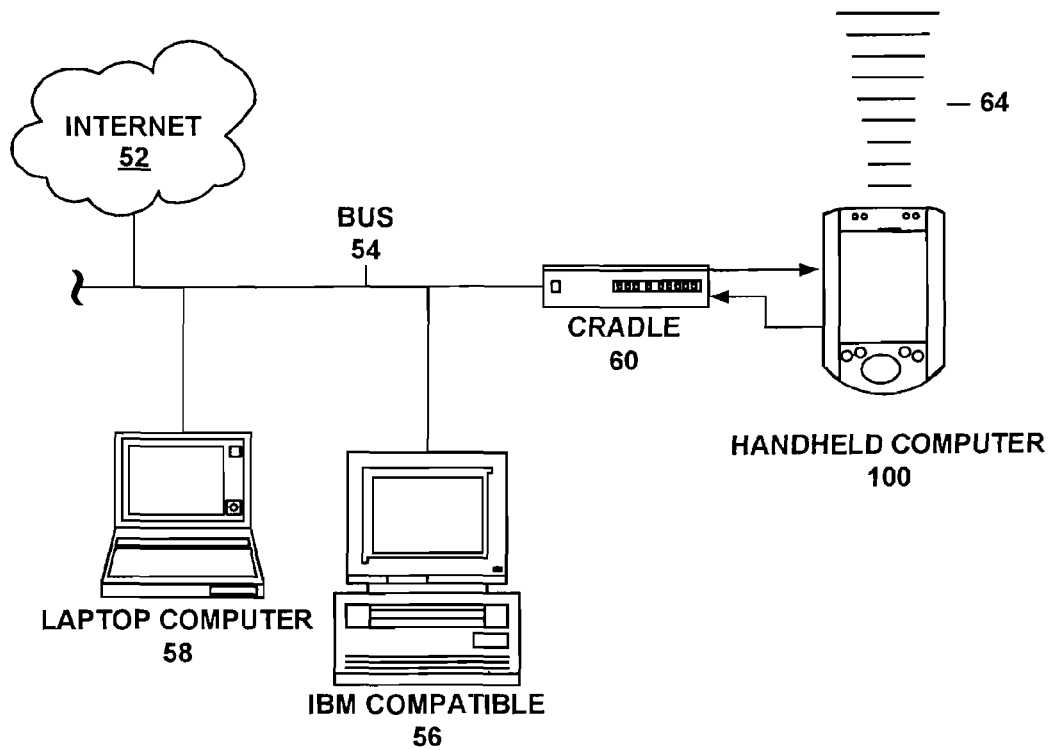
FIG. 2 is system illustration of an exemplary PDA computer system connected to other computer systems and the Internet via a cradle device.

FIG. 2 illustrates a system 50 that can be used in conjunction with various embodiments of the present invention. It is appreciated that the present invention can operate with a variety of host computer and peripheral computer platforms and that system 50 is merely exemplary. System 50 comprises a host computer system 56 which can be a desktop unit as shown or a laptop system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well known protocols.

Importantly, bus 54 is also coupled to a cradle 60 for receiving and initiating communication with a peripheral computer system, e.g., a palm top ("palm-sized") portable computer system 100. Cradle 60 provides an electrical and mechanical communication interface between bus 54 (and anything coupled to bus 54) and the computer system 100 for two way communications. Computer system 100 also contains a wireless infrared communication mechanism 64 for sending and receiving information from other devices.

Figure 3A:
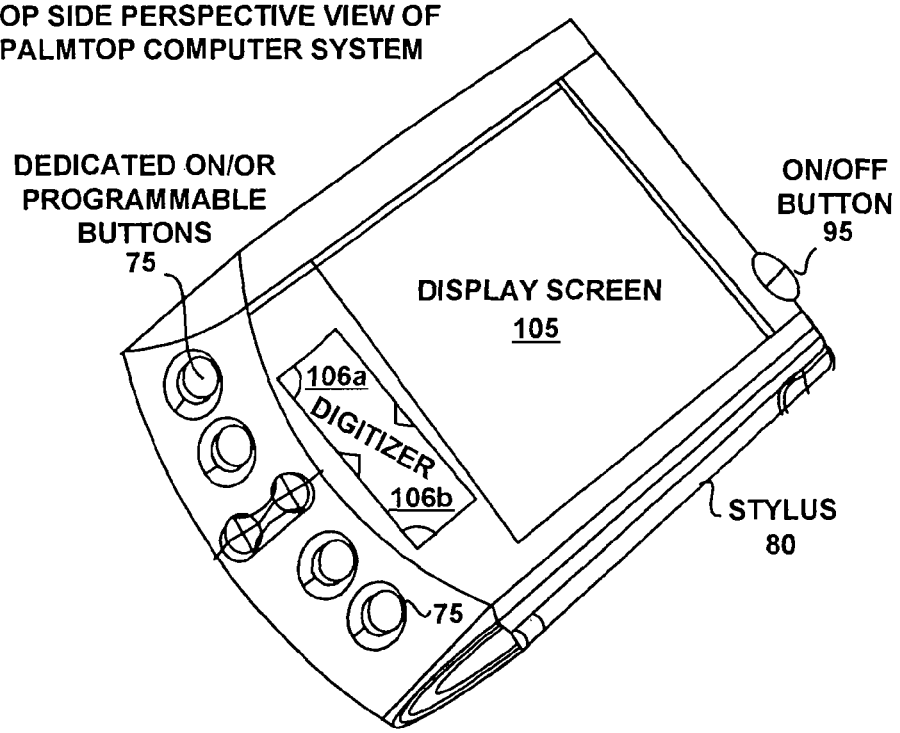
FIG. 3A is a top side perspective view of an exemplary PDA computer system.

FIG. 3A is a perspective illustration of the top face 100a of one embodiment of the exemplary PDA computer system. The top face 110a contains a display screen 105 surrounded by a bezel or cover. A removable stylus 80 is also shown. The display screen 105 is a touch screen able to register contact between the screen and the tip of the stylus 80. The stylus 80 can be of any material to make contact with the screen 105.

The top face 100a also contains one or more dedicated and/or programmable buttons 75 for selecting information and causing the computer system to implement functions. The on/off button 95 is also shown.

FIG. 3A also illustrates a handwriting recognition pad or "digitizer" containing two regions 106a and 106b. Region 106a is for the drawing of alphabetic characters therein (and not for numeric characters) for automatic recognition and region 106b is for the drawing of numeric characters therein (and not for alphabetic characters) for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 3B:
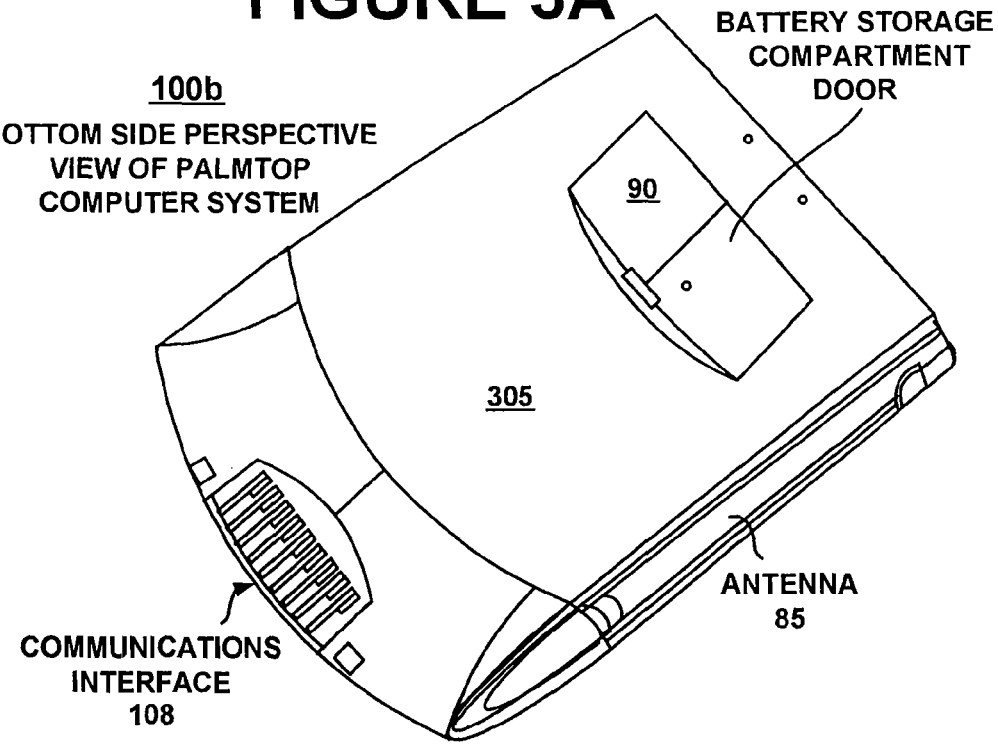
FIG. 3B is a bottom side perspective view of the exemplary PDA computer system of FIG. 3A.

FIG. 3B illustrates the bottom side 100b of one embodiment of the exemplary PDA computer system that can be used in accordance with various embodiments of the present invention. An optional extendible antenna 85 is shown and also a battery storage compartment door 90 is shown. A communication interface 108 is also shown. In one embodiment of the present invention, the serial communication interface 108 is a serial communication port, but could also alternatively be of any of a number of well known communication standards and protocols, e.g., parallel, SCSI, Firewire (IEEE 1394), Ethernet, etc.

Figure 4:
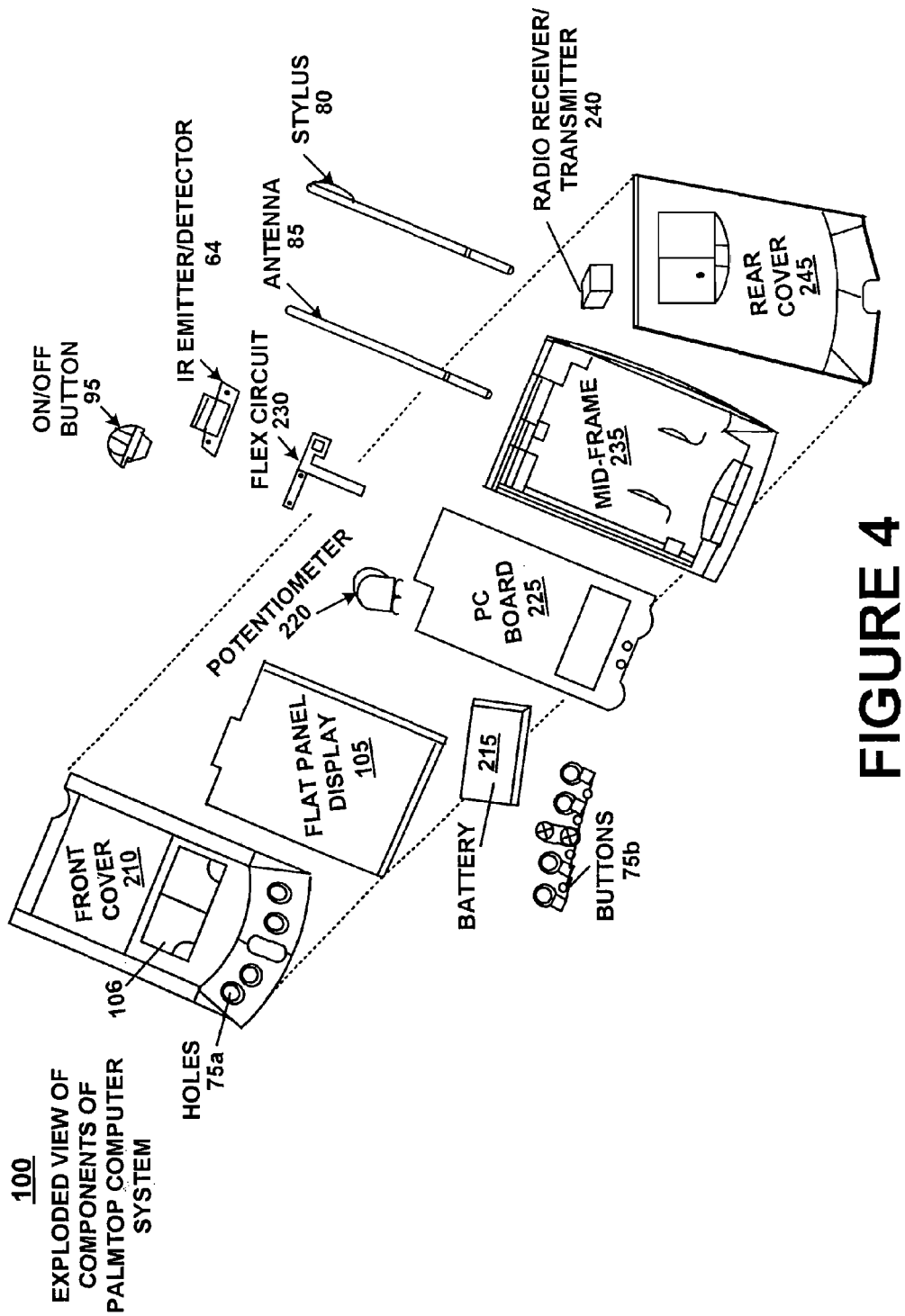
FIG. 4 is an exploded view of the components of the exemplary PDA computer system of FIG. 3A.

FIG. 4 is an exploded view of the exemplary PDA computer system 100 in accordance with one implementation. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., LCD, FED, plasma, etc., for the flat panel display 105. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A mid-frame 235 is shown along with stylus 80. Position adjustable antenna 85 is shown.

A radio receiver/transmitter device 240 is also shown between the mid-frame and the rear cover 245 of FIG. 4. The receiver/transmitter device 240 is coupled to the antenna 85 and also coupled to communicate with the PC board 225. In one implementation the Mobitex wireless communication system is used to provide two way communication between system 100 and other networked computers and/or the Internet via a proxy server.

Figure 5:
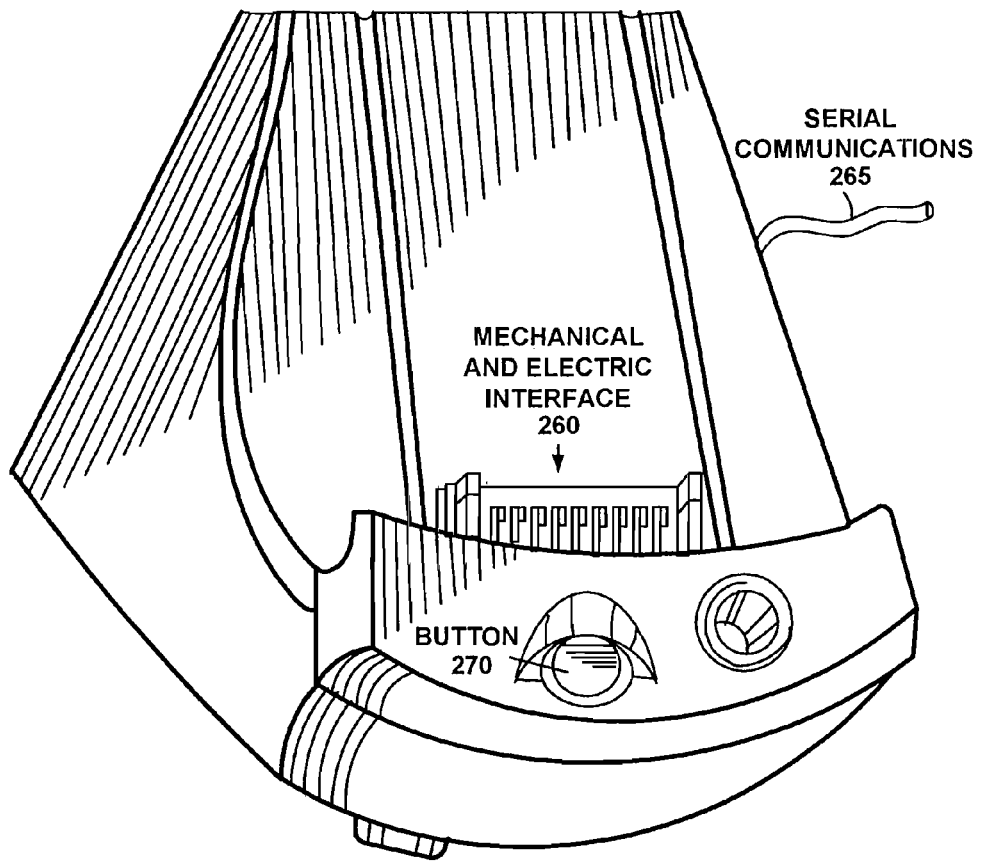
FIG. 5 is a perspective view of the cradle device for connecting the exemplary PDA computer system to other systems via a communication interface.

FIG. 5 is a perspective illustration of one embodiment of the cradle 60 for receiving the exemplary PDA computer system 100. Cradle 60 contains a mechanical and electrical interface 260 for interfacing with serial connection 108 (FIG. 2B) of computer system 100 when system 100 is slid into the cradle 60 in an upright position. Once inserted, button 270 can be pressed to initiate two way communication between system 100 and other computer systems coupled to serial communication 265.

Figure 6:
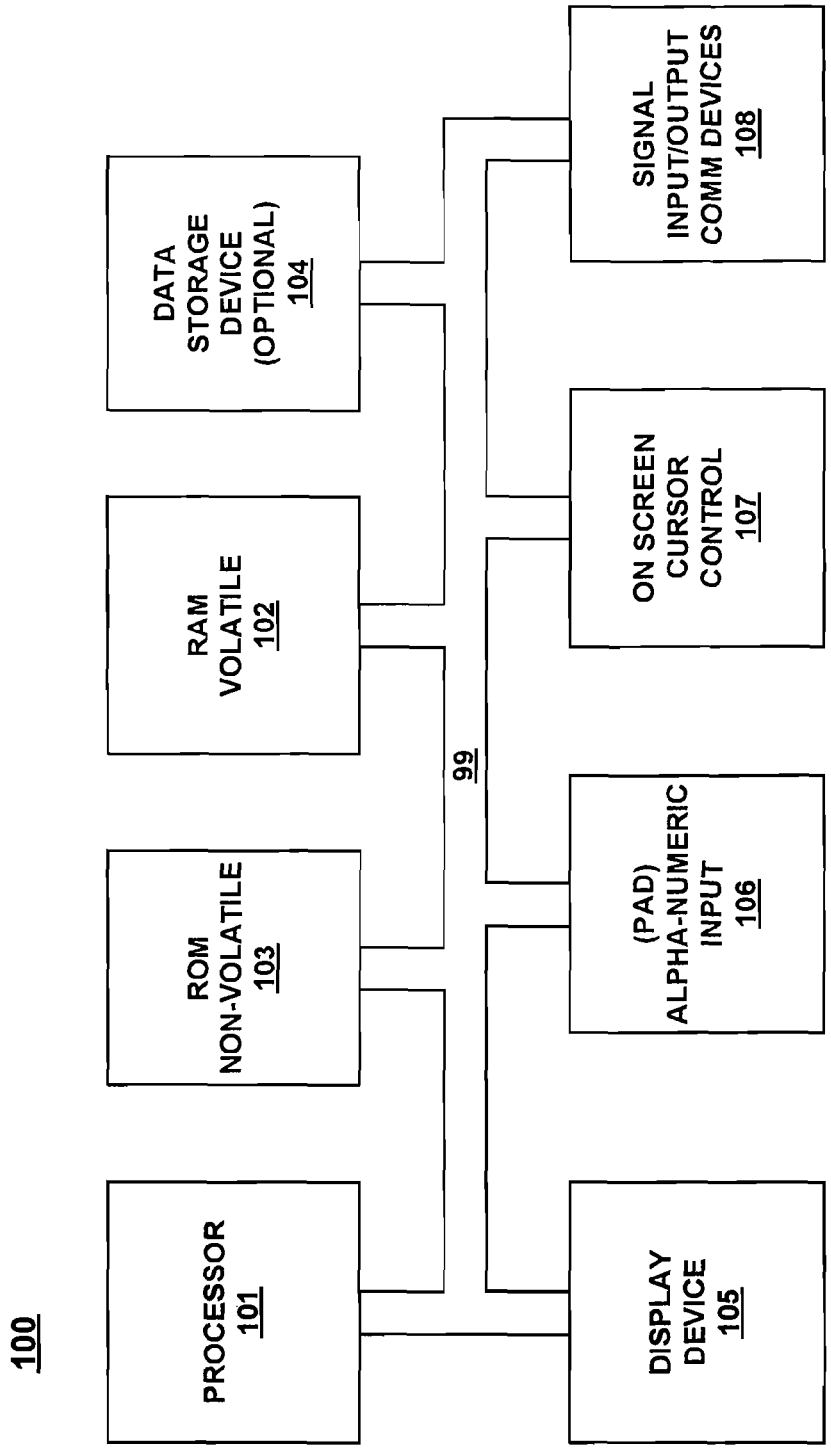
FIG. 6 is a logical block diagram of the exemplary PDA computer system in accordance with an embodiment of the present invention.

FIG. 6 illustrates circuitry of computer system 100, some of which can be implemented on PC board 225. Computer system 100 includes an address/data bus 99 for communicating information, a central processor 101 coupled with the bus for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 100 also includes an optional data storage device 104 (e.g., memory stick) coupled with the bus 99 for storing information and instructions. Device 104 can be removable. As described above, system 100 also contains a display device 105 coupled to the bus 99 for displaying information to the computer user. PC board 225 can contain the processor 101, the bus 99, the ROM 103 and the RAM 102.

Also included in computer system 100 of FIG. 6 is an optional alphanumeric input device 106 which in one implementation is a handwriting recognition pad ("digitizer") having regions 106a and 106b (FIG. 3A), for instance. Device 106 can communicate information and command selections to the central processor 101. System 100 also includes an optional cursor control or directing device 107 coupled to the bus 99 for communicating user input information and command selections to the central processor 101. In one implementation, device 107 is a touch screen device incorporated with screen 105. Device 107 is capable of registering a position on the screen 105 where the stylus makes contact. The display device 105 utilized with the computer system 100 may be a liquid crystal device, cathode ray tube (CRT), field emission device (FED, also called flat panel CRT) or other display device suitable for creating graphic images and alphanumeric characters recognizable to the user. In the preferred embodiment, display 105 is a flat panel display.

Signal communication device 108, also coupled to bus 99, can be a serial port for communicating with the cradle 60. Device 108 can also include an infrared communication port.

Figure 7:
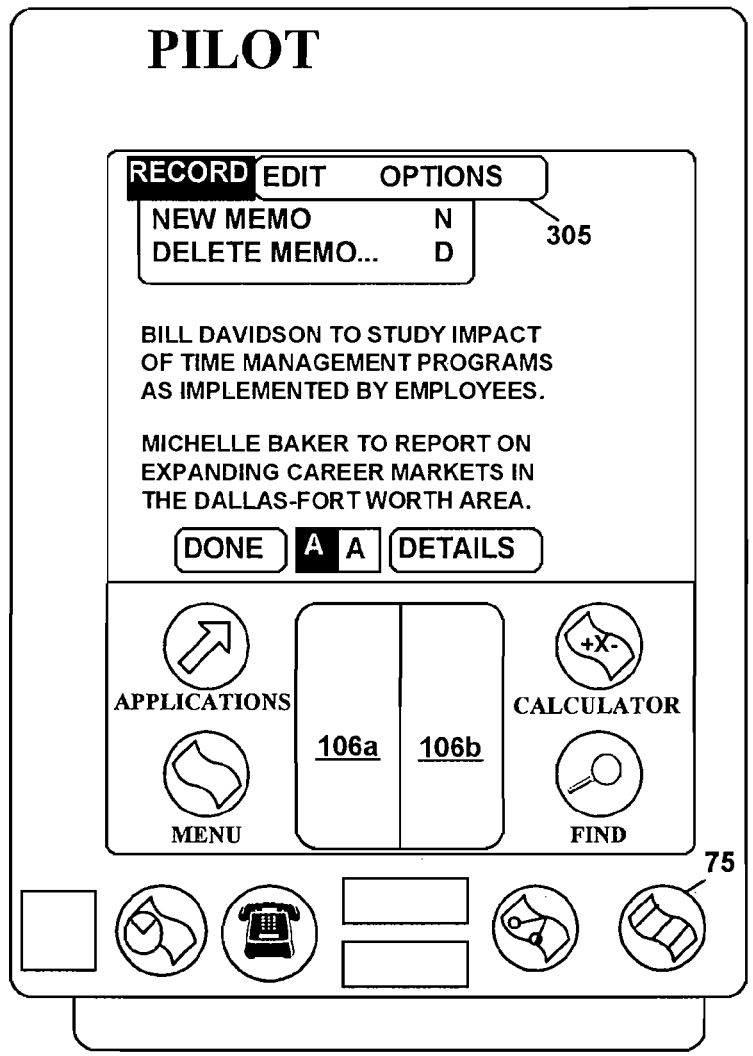
FIG. 7 is a front view of a exemplary PDA computer system illustrating the display screen, digitizer regions and an exemplary menu in accordance with the present invention.

FIG. 7 is a front view of the exemplary PDA computer system 100 with a menu bar 305 open displaying a pull down window. Also shown are two regions of digitizer 106a and 106b. Region 106a is for receiving user stroke data for alphabet characters, and typically not numeric characters, and region 106b is for receiving user stroke data for numeric data, and typically not for alphabetic characters. Physical buttons 75 are also shown. Although different regions are shown for alphabetic and numeric characters, the present invention is also operable within a single region that recognizes both alphabetic and numeric characters.

Method and System for Restoring Basic Functionality to a Device which has Lost the Contents of Volatile Memory PDA devices contain synchronization code in non-volatile memory which can be used to synchronize to a desktop computer. The present invention takes advantage of this code to synchronize with a server that appears to the PDA as a desktop computer. Thus, the server functions as a publicly available desktop computer with which to synchronize, in the field, PDAs which have lost the contents of volatile memory or PDAs which were purchased as replacements.

Figure 8:
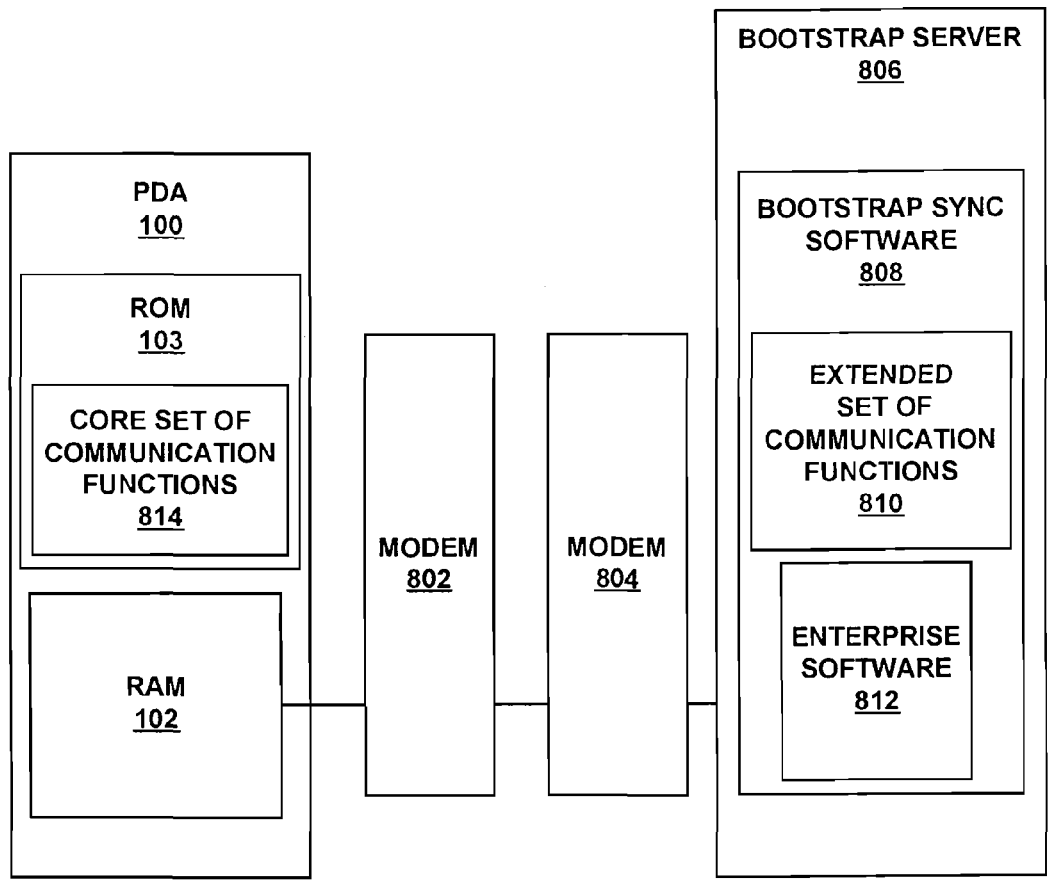
FIG. 8 is a block diagram showing a PDA which has lost the contents of volatile memory synchronizing with a server, according to an embodiment of the present invention.

FIG. 8 shows a block diagram of a PDA computer 100 connected to a bootstrap server 806 via a modem 802. The PDA 100 pictured has lost all software in volatile memory (RAM) 102 due e.g., to battery failure and hence must rely on software stored in non-volatile memory (ROM) 103. The synchronization logic software stored in ROM 103 is ordinarily used to synchronize to a desktop computer system 56 (FIG. 2). However, in the present invention, the synchronization logic stored in ROM 103, referred to as the core set of communication functions 814, is used to connect to and synchronize with a remote bootstrap server 806.

The PDA 100 stores the software ordinarily used to synchronize with a server in volatile memory 102. As the PDA 100 has lost the contents of volatile memory 102, a connection to the bootstrap server 806 would be impossible under the conventional method of using RAM 102 based software. However, the present invention allows the PDA 100 to connect to and synchronize with the server 806 by using the core set of communication functions 814, which is ordinarily used to synchronize with a desktop computer 56. The illustrated bootstrap server 806 thus appears to the PDA 100 as a desktop 56. In this fashion, the PDA 100 is able to regain the basic functionality that was lost when the battery 215 (FIG. 4) fails.

Referring still to FIG. 8, bootstrap server 806 has bootstrap synchronization software 808, which is used to synchronize with the PDA 100 as a desktop system 56 ordinarily would when the battery 215 fails. (That is, with ROM 103 based software.) Server also has an extended set of communication functions 810, which may be sent to the PDA 100 to help it regain basic functionality. In one embodiment, the bootstrap server 806 also has enterprise software 812 which may be sent to the PDA 100 as well. Enterprise software may encompass: enterprise server synchronization software, application programs, backed-up data, etc. It will be understood that any subset of the enterprise software 812 may be present on the bootstrap server 806. The present invention transfers sufficient software from the bootstrap server 806 such that the PDA 100 regains basic functionality and may once again connect to and synchronize with various servers.

Frequently, PDAs 100 used in the field connect to an enterprise server. For example, members of a sales force may synchronize their PDAs 100 to the same corporate server. These PDAs 100 frequently have special enterprise server synchronization software, which may be specially adapted to function with the enterprise server. Because this software is installed after manufacture of the PDA 100, it is often stored in RAM 102. In this case, this software must be restored after a battery 215 failure. Additionally, the PDA may need to restore a tool (FIG. 9, 902) and an associated software application, such as a spreadsheet program. For example, the PDA may be used to enter inventory data which is transferred to a remote enterprise server, wherein the PDA has application software designed to facilitate inventory data entry.

Figure 9:
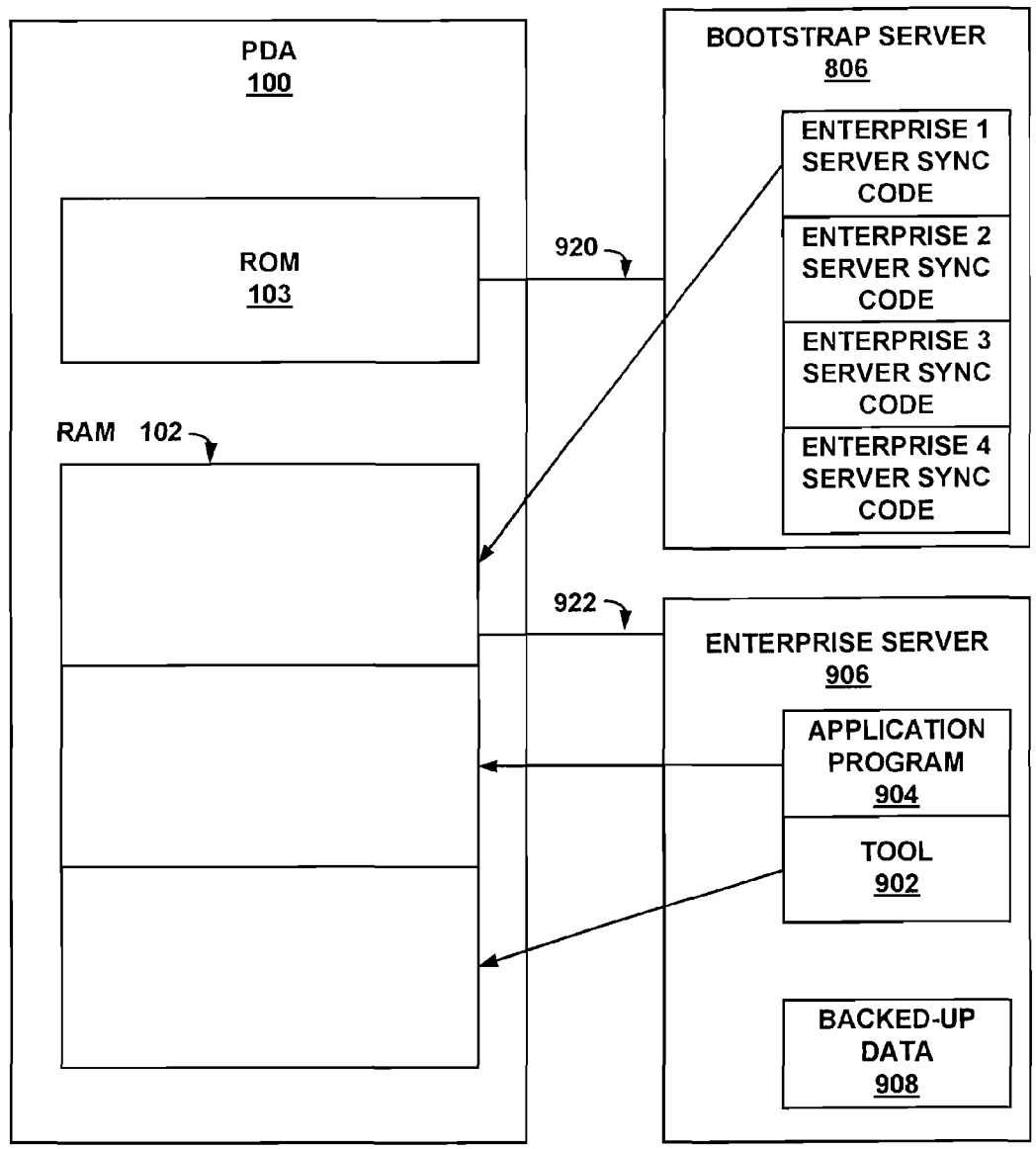
FIG. 9 is a block diagram detailing locations and transfers of software, according to an embodiment of the present invention.

FIG. 9 is a block diagram of a PDA showing locations of key software and software transfers which occur, according to one embodiment of the present invention. The present invention allows the user to first synchronize to the bootstrap server 806 using ROM 103 based software. In one embodiment, the PDA 100 to bootstrap server 806 connection 920 is made over a telephone line. In synchronizing, enterprise server synchronization software 812 is transferred to the PDA 100 and stored in RAM 102. Thus, the PDA 100 may then synchronize to the enterprise server 906 to restore the tool 902, the associated application program 904, and backed up data 908. The PDA 100 to enterprise server 906 connection 922 may be made via the Internet or without making an Internet connection. In another embodiment, all software resides on the bootstrap server 806. In one embodiment, bootstrap server 806 contains operating system patches, which the PDA 100 may request.

Figure 10:
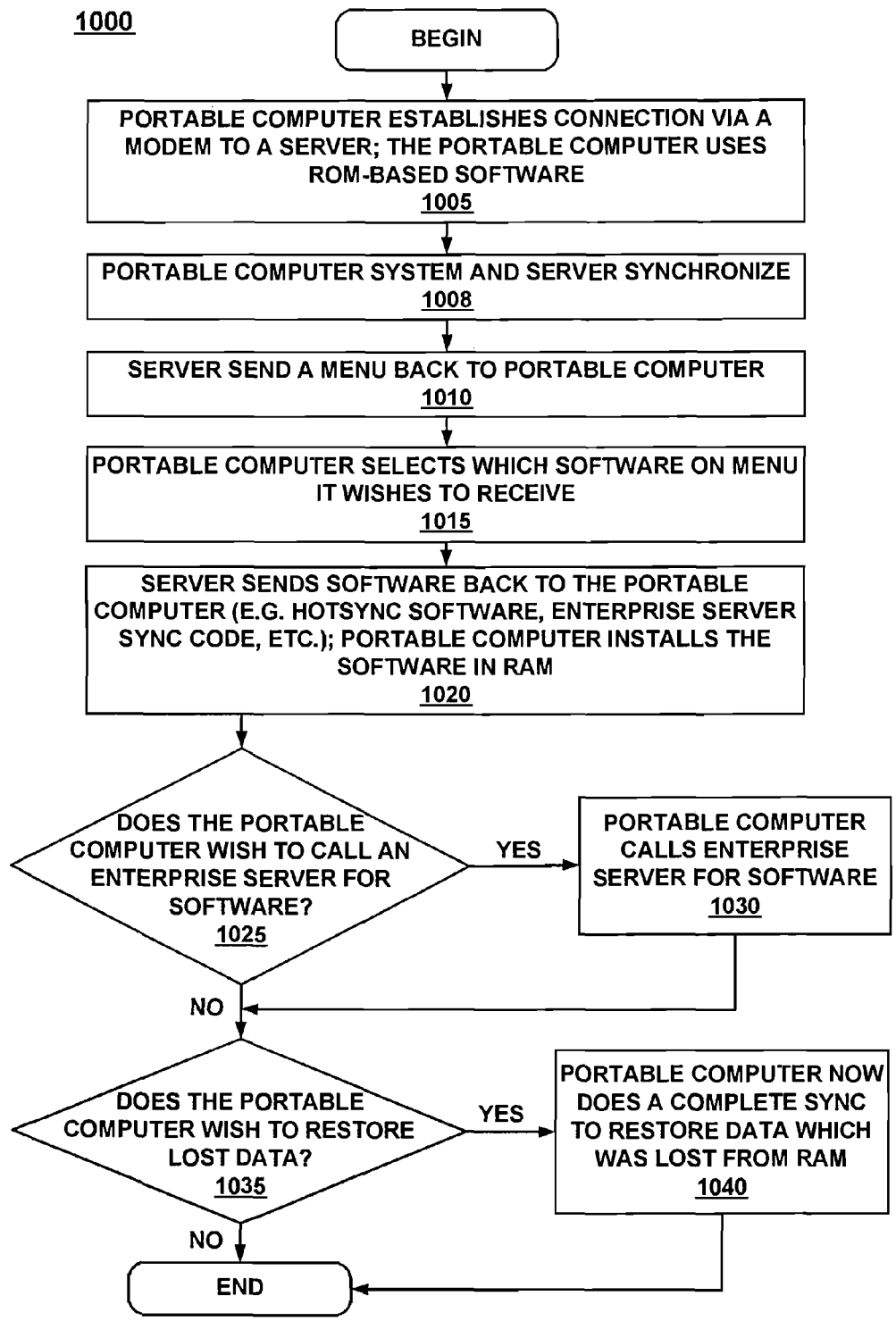
FIG. 10 is a flowchart of the process of restoring basic functionality to a portable computer system which has lost the contents of volatile memory, according to an embodiment of the present invention.

FIG. 10 shows a flowchart 1000 of the steps of restoring functionality to a PDA 100, according to an embodiment of the present invention. In step 1005, a PDA computer 100 which has lost the contents of volatile memory 103 establishes a connection via a modem 802 to a server 806. In step 1008, the PDA 100 must use only code which was stored in non-volatile memory 103; therefore, the bootstrap server 806 uses synchronization code which is compatible with the code which the PDA 100 has stored in ROM 103. The bootstrap server 806 recognizes the PDA's 100 attempt at synchronization as a call for help and sends back a menu of options, in step 1010.

In step 1015, the device 100 selects which software it wishes to receive from the server 806. In step 1020, the server 806 sends back the requested software, which the PDA 100 installs in its volatile memory 102. After installing this first software, the PDA 100 regains basic functionality. Next, in step 1025 the PDA user decides whether to contact an enterprise server 906. If so, in step 1030, the PDA connects to the enterprise server 906, using the enterprise server synchronization code 812 which was transferred from the bootstrap server 806 and stored in RAM 102. The connection to the enterprise server 906 may be made with or without a connection to the Internet 52. In another embodiment, it is not necessary to call a new number, as all synchronizations are done in one call. It will be understood to those of ordinary skill in the art that other possible ways exist for restoring the device's functionality, once the connection has been made to the bootstrap server 806.

In step 1035, the user decides whether data needs to be restored. If so, in step 1040 the PDA 100 synchronizes to the server which contains the backed up data. This could be either the bootstrap server 806 or the enterprise server 906, depending on the embodiment.

The preferred embodiment of the present invention, a method and system for restoring basic functionality to a portable computer which has lost the content of volatile memory, is thus described. While the present invention has been described in particular embodiments, it should be appreciated that the present invention should not be construed as limited by such embodiments, but rather construed according to the below claims.

What is claimed is:

1. A data processing system comprising:
   a bootstrap server having a synchronization capability compatible with a core set of communication functions, said synchronization capability stored thereon;
   an inoperable portable computer system having a core set of communication functions stored in non-volatile memory thereon, said core set of communication functions operable to allow said portable computer system to communicate with said bootstrap server;
   a communication network configured to transfer data between said bootstrap server and said portable computer system;
   wherein said bootstrap server is for transferring said core set of communication functions to said portable computer system through said communication network; and
   an enterprise server operable to connect to said portable computer system, wherein said portable computer system and said enterprise server communicate and transfer information, with said portable computer system using said core set of communication functions.

2. A data transfer system comprising:
   a portable computer system having:
      a volatile memory containing data and software wherein said data and software are inoperable;
      a non-volatile memory containing a core set of communication functions; and
      a communication interface;
   a bootstrap server having:
      a synchronization capability compatible with said core set of communication functions; and
      a communication interface;
   a communication network configured to transfer data between said portable computer system and said bootstrap server;
   wherein upon request from said portable computer system, said bootstrap server synchronization capability sends connection software data to said portable computer system transforming volatile memory such that said volatile memory data and software become at least partially operable; and wherein said connection software data enables a data source to communicate with said portable computer system.

3. The system of claim 2 further comprising said data source transferring data to said portable computer system.

4. The system of claim 2, wherein said portable computer system is a personal digital assistant.

5. The system of claim 2, wherein said data source is an enterprise sever.

6. A data transfer method between a bootstrap server, an enterprise server, and a portable computer system comprising the steps of:

receiving a request at a bootstrap server from a portable computer system having inoperable volatile memory and synchronization code stored in non-volatile memory;

transferring a first software compatible with said synchronization code from said bootstrap server to said portable computer system;

selecting second software by said portable computer system, wherein said selection indicates software to be installed in said volatile memory; and determining whether to connect said portable computer system to enterprise server.

7. The method of claim 6, further comprising the step of synchronizing said portable computer system with said enterprise server using said second software.

* * * * *